(12) United States Patent
Masson et al.

(10) Patent No.: US 8,092,162 B2
(45) Date of Patent: Jan. 10, 2012

(54) TURBOCHARGER ASSEMBLY HAVING HEAT SHIELD-CENTERING ARRANGEMENTS

(75) Inventors: Patrick Masson, Urimenil (FR); Alain Lombard, Uxegney (FR); Jerome Mitka, Houdemont (FR); Valerie Bribant, Golbey (FR); Phillippe Noelle, Vincey (FR)

(73) Assignee: Honeywell International Inc., Morristown, NJ (US)

( * ) Notice: Subject to any disclaimer, the term of this patent is extended or adjusted under 35 U.S.C. 154(b) by 865 days.

(21) Appl. No.: 12/043,630

(22) Filed: Mar. 6, 2008

(65) Prior Publication Data

US 2009/0226307 A1    Sep. 10, 2009

(51) Int. Cl.
*F04D 29/58* (2006.01)
(52) U.S. Cl. ........................................................ 415/177
(58) Field of Classification Search .................. 415/177, 415/180
See application file for complete search history.

(56) References Cited

U.S. PATENT DOCUMENTS

| | | | | |
|---|---|---|---|---|
| 5,890,881 | A * | 4/1999 | Adeff | 417/407 |
| 6,017,184 | A * | 1/2000 | Aguilar et al. | 415/112 |
| 6,449,950 | B1 | 9/2002 | Allen et al. | |
| 7,001,142 | B2 * | 2/2006 | Knauer et al. | 415/160 |
| 7,802,429 | B2 * | 9/2010 | Yokoyama et al. | 60/605.3 |
| 2008/0080966 | A1 * | 4/2008 | Ueno et al. | 415/112 |
| 2009/0060737 | A1 * | 3/2009 | Frankenstein et al. | 415/229 |

FOREIGN PATENT DOCUMENTS

| | | |
|---|---|---|
| EP | 0248624 | 1/1987 |
| EP | 1785613 A2 | 9/2006 |
| JP | 63143327 | 6/1988 |
| WO | W09823886 | 6/1998 |
| WO | WO9907982 A1 | 2/1999 |
| WO | W02006046892 | 5/2006 |

* cited by examiner

Primary Examiner — Edward Look
Assistant Examiner — Liam McDowell
(74) Attorney, Agent, or Firm — Alston & Bird LLP (57) ABSTRACT

A turbocharger for internal combustion engines, having a heat shield disposed between a turbine housing and center housing of the turbocharger for shielding the center housing from exhaust gases passing through the turbine. The heat shield in one embodiment is centered on a generally conical surface of the center housing, by engagement between the conical surface and a centering portion of the heat shield. In another embodiment, the heat shield has a generally conical portion that is non-axisymmetric, having a plurality of radially enlarged lobes that engage a radially inwardly facing surface of the turbine housing for centering the heat shield.

4 Claims, 8 Drawing Sheets

TURBOCHARGER ASSEMBLY HAVING HEAT SHIELD-CENTERING ARRANGEMENTS

BACKGROUND OF THE INVENTION

The present invention relates to turbochargers for internal combustion engines.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

A turbocharger typically includes a heat shield or shroud disposed between the turbine assembly and the center housing for shielding the center housing from direct contact with the hot exhaust gas. In some cases, the heat shield is coaxially centered in the assembly by engagement with the turbine housing. Consequently, during assembly, before the turbine housing is mated with the center housing, there is nothing to keep the heat shield centered on the center housing, and it can fall downward whenever the partial assembly is oriented with its central longitudinal axis non-vertical.

While the above-described turbochargers function well, further improvements are sought.

BRIEF SUMMARY OF THE DISCLOSURE

In accordance with one aspect of the present disclosure, in a turbocharger generally of the type described above, the center housing has a nose portion defining a generally planar first surface facing generally axially toward and spaced from a generally planar opposing surface of the turbine housing, the first surface being spaced axially from the turbine wheel by a first axial distance. The nose portion further comprises a generally conical centering surface extending from the first surface and decreasing in diameter in an axial direction toward the turbine wheel. The centering surface is substantially coaxial with a central longitudinal axis of the center housing. The turbocharger includes a heat shield having an outer portion captured between the first surface of the center housing and the opposing surface of the turbine housing, and a centering portion extending from the outer portion generally axially toward the turbine wheel. The centering surface of the center housing is positioned to engage the centering portion of the heat shield so as to locate the heat shield substantially coaxially with respect to the central longitudinal axis of the center housing.

In one embodiment, the centering surface of the center housing joins with a generally planar second surface located radially inwardly relative to the centering surface and facing generally axially toward the turbine wheel and spaced axially from the turbine wheel by a second axial distance smaller than the first axial distance. In a further refinement of this embodiment, the heat shield includes an inner portion joined with the centering portion and extending radially inwardly therefrom, and this inner portion is axially spaced from the second surface of the center housing.

In one embodiment, the heat shield comprises a piece of sheet metal formed into a non-planar configuration.

In a further embodiment, the center housing includes a generally cylindrical surface facing radially outwardly and located radially outwardly relative to the first surface and spaced axially from the turbine wheel by a distance greater than the first axial distance. The generally cylindrical surface of the center housing is substantially coaxial with the central longitudinal axis. The turbine housing includes a generally cylindrical surface facing radially inwardly and engaged with the generally cylindrical surface of the center housing for coaxially locating the turbine housing relative to the center housing.

In a further refinement of this embodiment, a juncture extends between the generally cylindrical surface of the turbine housing and said opposing surface of the turbine housing, the juncture comprising a smoothly curved radius.

In accordance with another aspect of the invention, the heat shield is centered on the turbine housing. The center housing defines a generally planar first surface facing generally axially toward and axially spaced from a generally planar opposing surface of the turbine housing, the first surface being spaced axially from the turbine wheel by a first axial distance. The turbine housing includes a generally cylindrical surface facing radially inwardly and located radially inwardly relative to said opposing surface. The heat shield has an outer portion captured between the first surface of the center housing and the opposing surface of the turbine housing, and a centering portion extending from the outer portion generally axially toward the turbine wheel, the centering portion passing directly radially inwardly of the generally cylindrical surface of the turbine housing. The centering portion of the heat shield has a non-axisymmetric configuration characterized by a plurality of relatively smaller-radius portions alternating in a circumferential direction with a plurality of relatively larger-radius portions. Radial clearances exist between the smaller-radius portions and the generally cylindrical surface of the turbine housing, while the larger-radius portions engage the generally cylindrical surface of the turbine housing so as to locate the heat shield substantially coaxially with respect to a central longitudinal axis of the turbine housing.

In one embodiment, the heat shield includes an inner portion joined with the centering portion and extending radially inwardly therefrom, and the inner portion is axially spaced from the center housing.

In one embodiment, the center housing includes a generally cylindrical surface facing radially outwardly and located radially outwardly relative to the first surface and spaced axially from the turbine wheel by a distance greater than the first axial distance, the generally cylindrical surface of the center housing being substantially coaxial with a central longitudinal axis of the center housing. The turbine housing includes a second generally cylindrical surface facing radially inwardly and engaged with the generally cylindrical surface of the center housing for coaxially locating the turbine housing relative to the center housing. A juncture extends between the second generally cylindrical surface of the turbine housing and said opposing surface of the turbine housing, the juncture comprising a smoothly curved radius.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
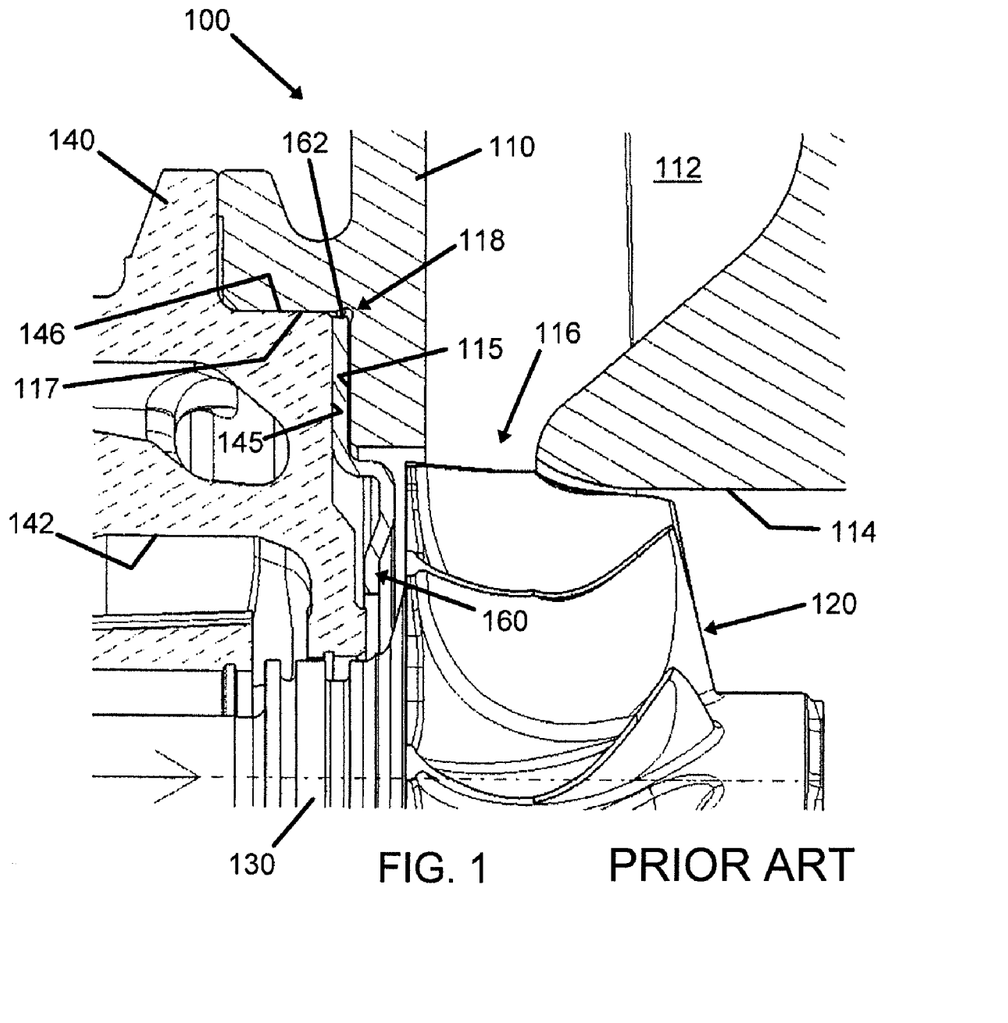
FIG. 1 is a fragmentary cross-sectional view of a turbocharger assembly that does not include the features of the present invention.

FIG. 1 illustrates a cross-section of a turbocharger assembly 100 that does not include features in accordance with the present invention. The assembly includes a turbine housing 110 that defines a generally annular or volute-shaped chamber 112 arranged for receiving exhaust gas from an internal combustion engine. Radially inward of the chamber is an axially extending central bore 114 for discharging the exhaust gas from the turbine housing. Located in an upstream region of the bore is a turbine wheel 120 mounted on one end of a rotatable shaft 130. The turbine housing defines a nozzle 116 that leads from the chamber 112 radially inwardly to the turbine wheel. Exhaust gas flows from the chamber 112 through the nozzle 116 and is expanded through the turbine wheel 120, and is then discharged through the bore 114.

The assembly 100 also includes a center housing 140 that is affixed to one side of the turbine housing 110. The center housing has a passage 142 for the shaft 130 to pass through, and the passage houses one or more bearings (not shown) for the shaft.

In order to shield the center housing 140 from the hot exhaust gas passing through the turbine wheel, the assembly also includes a generally ring-shaped heat shield 160 captured between the turbine housing 110 and center housing 140. In this regard, the center housing defines a generally planar surface 145 facing generally axially toward and axially spaced from a generally planar opposing surface 115 of the turbine housing. The heat shield 160 has a radially outer portion captured between the surface 145 of the center housing and the opposing surface 115 of the turbine housing, and a radially inner portion extending radially inwardly from the outer portion and disposed so as to substantially shield the center housing from exhaust gas.

While the assembly 100 is being assembled, the heat shield 160 is located substantially coaxially relative to the center housing 140 by engagement between the radially outer edge 162 of the heat shield and a substantially cylindrical radially inwardly facing surface 117 of the turbine housing. This surface 117 of the turbine housing engages a substantially cylindrical radially outwardly facing surface 146 of the center housing so as to locate the turbine housing substantially coaxially with respect to the center housing. The heat shield 160 is then located substantially coaxially with respect to the turbine housing surface 117, and therefore with respect to the center housing as well. As a result, in order to avoid a sharp corner between the turbine housing surfaces 117 and 115, it is necessary to machine an undercut 118 at the juncture between these surfaces.

It has been found that this undercut 118 is prone to cracking because of cyclic thermally induced stresses and strains. A further drawback of this arrangement is that until the turbine housing is placed on the center housing, there is nothing to locate the heat shield 160 coaxially with respect to the center housing. If the assembly is not oriented with its central axis vertical (which is frequently the case during assembly), then the heat shield is prone to slipping down into an off-center position, which is undesirable.

Figure 2:
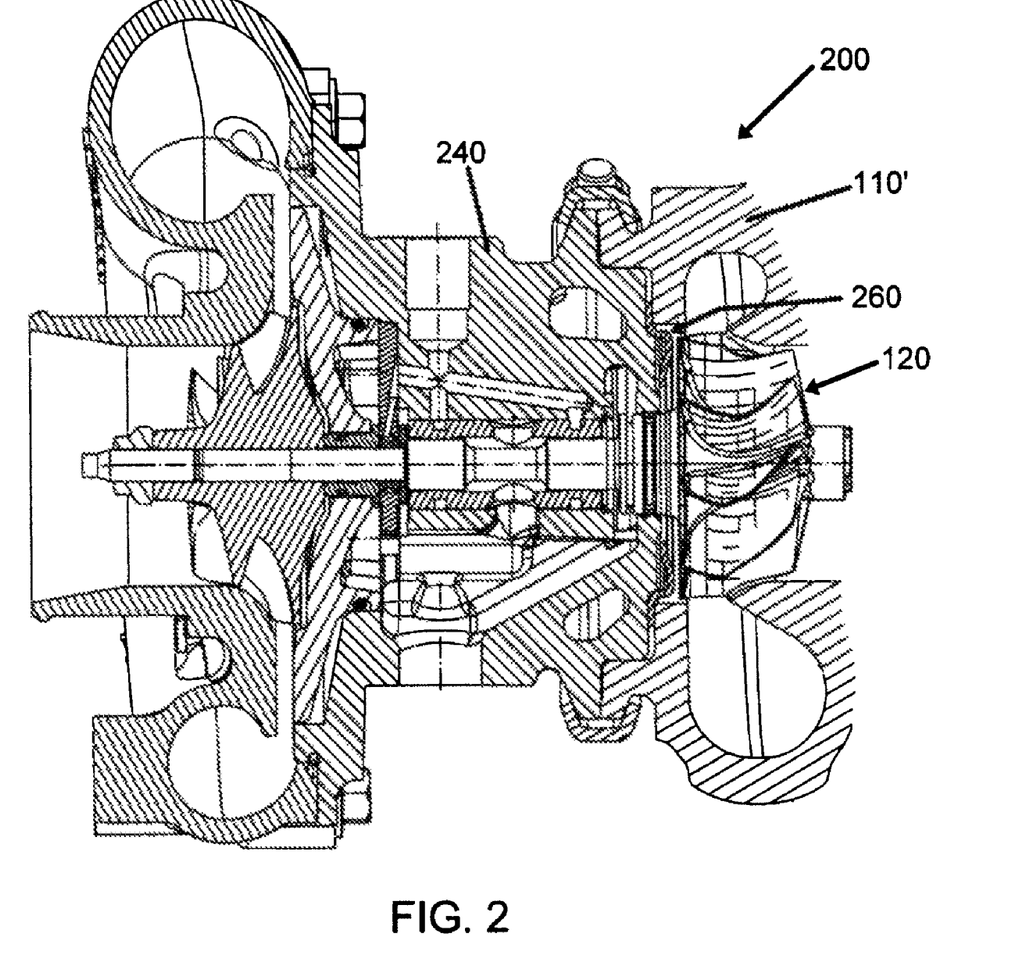
FIG. 2 is a cross-sectional view of a turbocharger assembly in accordance with one embodiment of the invention.
Figure 3:
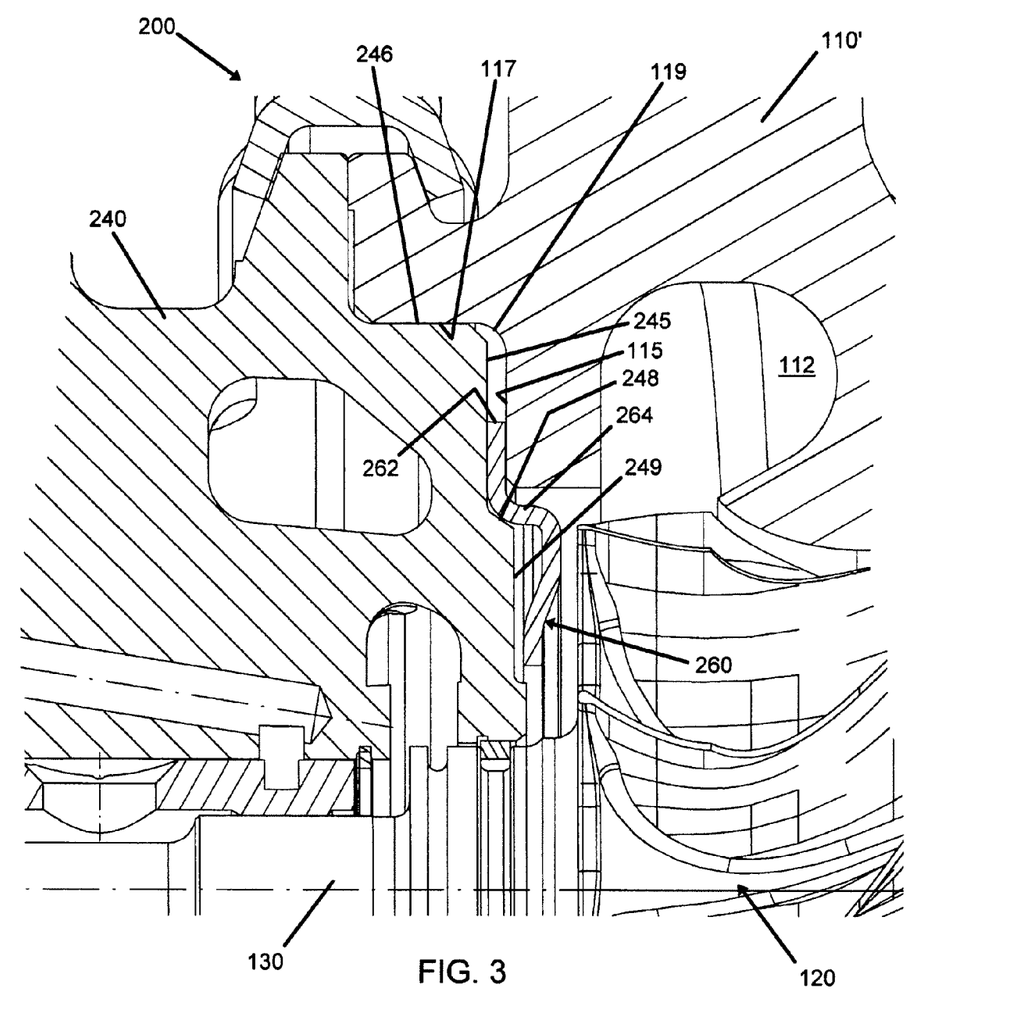
FIG. 3 is a magnified portion of the cross-sectional view of FIG. 2.

The present invention aims at least in part to alleviate or reduce the severity of these drawbacks. A turbocharger assembly 200 in accordance with one embodiment of the invention is shown in FIGS. 2 and 3. The assembly includes a turbine wheel 120 and shaft 130 as the prior embodiment, so these parts are not described again here. The turbine housing 110' of this embodiment is slightly modified relative to the previous turbine housing 110, as further described below, but in most respects is the same as the prior housing. As in the prior embodiment, the turbine housing 110' has a cylindrical surface 117 that engages a cylindrical surface 246 of the center housing to locate the turbine housing coaxially relative to the center housing. The center housing includes a substantially planar axially facing surface 245 spaced from the opposing axially facing surface 115 of the turbine housing.

Figure 4:
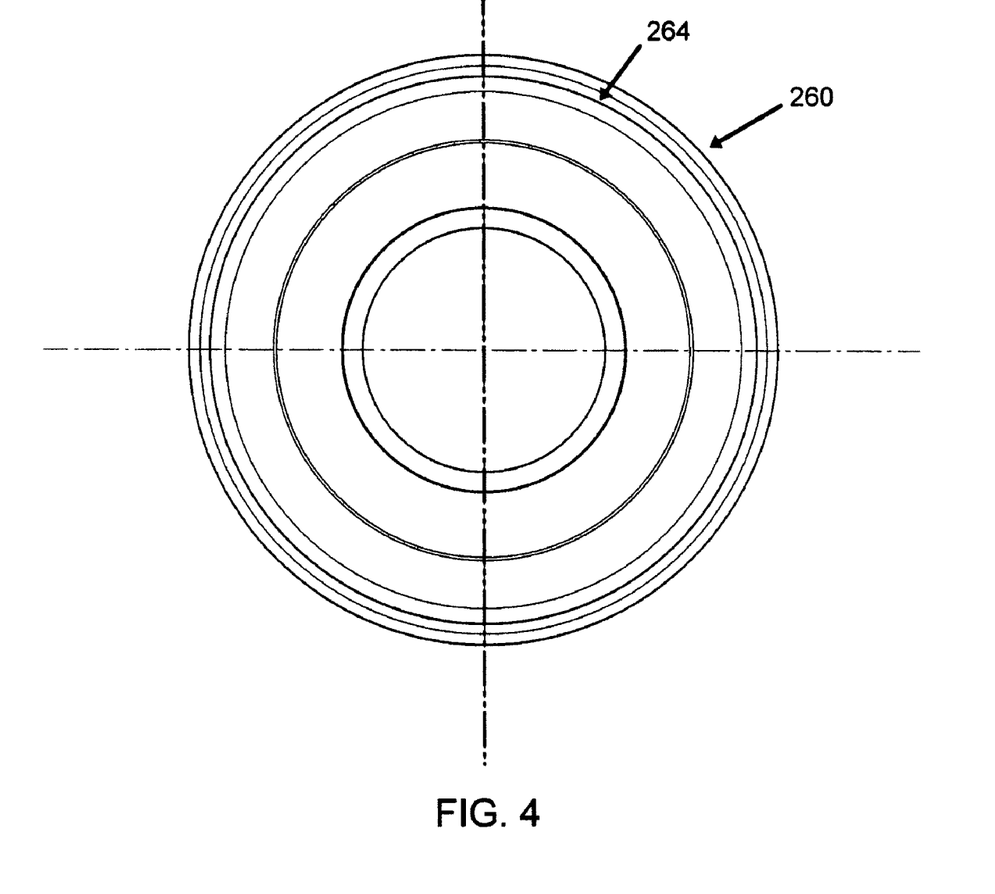
FIG. 4 is a plan view of the heat shield used in the turbocharger of FIGS. 2 and 3.

The assembly 200 includes a modified heat shield 260 (shown in isolated plan view in FIG. 4), and the center housing 240 is also modified relative to the prior embodiment. More particularly, in the assembly 200 the heat shield 260 is located substantially coaxially by engagement with the center housing rather than with the turbine housing. In this regard, the center housing has a nose portion proximate the turbine wheel 120, comprising a generally conical centering surface 248 extending from the radially inner edge of the surface 245 and decreasing in diameter in an axial direction toward the turbine wheel, the centering surface being substantially coaxial with a central longitudinal axis of the center housing. The nose portion further includes a generally planar surface 249 located radially inwardly relative to the centering surface 248 and facing generally axially toward the turbine wheel, and spaced axially from the turbine wheel by an axial distance smaller than the axial distance between the surface 245 and the turbine wheel.

The heat shield 260 has an outer portion captured between the surface 245 of the center housing and the opposing surface 115 of the turbine housing, a centering portion 264 extending from the outer portion generally axially toward the turbine wheel, and an inner portion that extends radially inwardly from the centering portion. The centering surface 248 of the center housing is positioned to engage the centering portion 264 of the heat shield so as to locate the heat shield substantially coaxially with respect to the central longitudinal axis of the center housing.

By thus centering the heat shield 260 on the center housing 240, the outer edge 262 of the heat shield can be of substantially smaller radius than the turbine housing surface 117. This in turn allows the juncture between the surface 117 and the adjoining surface 115 to be formed as a generous radius 119. This radius is expected to substantially reduce the incidence of thermal cracking in this location.

A further advantage of the assembly 200 is that because the heat shield 260 does not depend on the turbine housing 110' for centering, but rather is centered by the center housing, the heat shield is not nearly as prone to slipping from its centered position during assembly compared to the prior embodiment. This facilitates easier assembly of the turbocharger.

Figure 5:
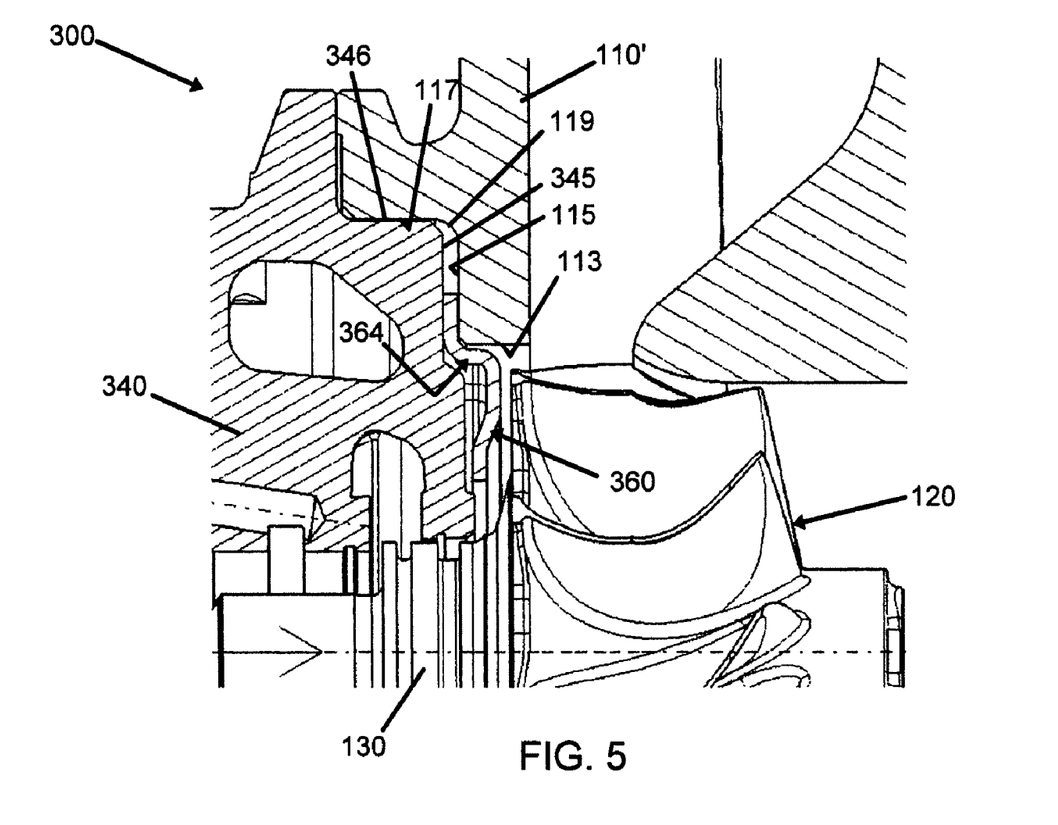
FIG. 5 is a fragmentary cross-sectional view of a turbocharger assembly having a heat shield in accordance with another embodiment of the invention.

A further embodiment of the invention is now described with reference to FIGS. 5 through 8. FIG. 5 depicts a turbocharger assembly 300 comprising the same turbine housing 110', turbine wheel 120, and shaft 130 as the FIG. 2 embodiment, and having a modified center housing 340 and modified heat shield 360. In this embodiment, the heat shield 360 is centered by the turbine housing 110' rather than the center housing. The heat shield is shown in further detail in FIGS. 6 through 8.

As in the prior embodiment, the turbine housing 110' has a cylindrical surface 117 that engages a cylindrical surface 346 of the center housing to locate the turbine housing coaxially relative to the center housing. The center housing includes a substantially planar axially facing surface 345 spaced from the opposing axially facing surface 115 of the turbine housing.

Figure 6:
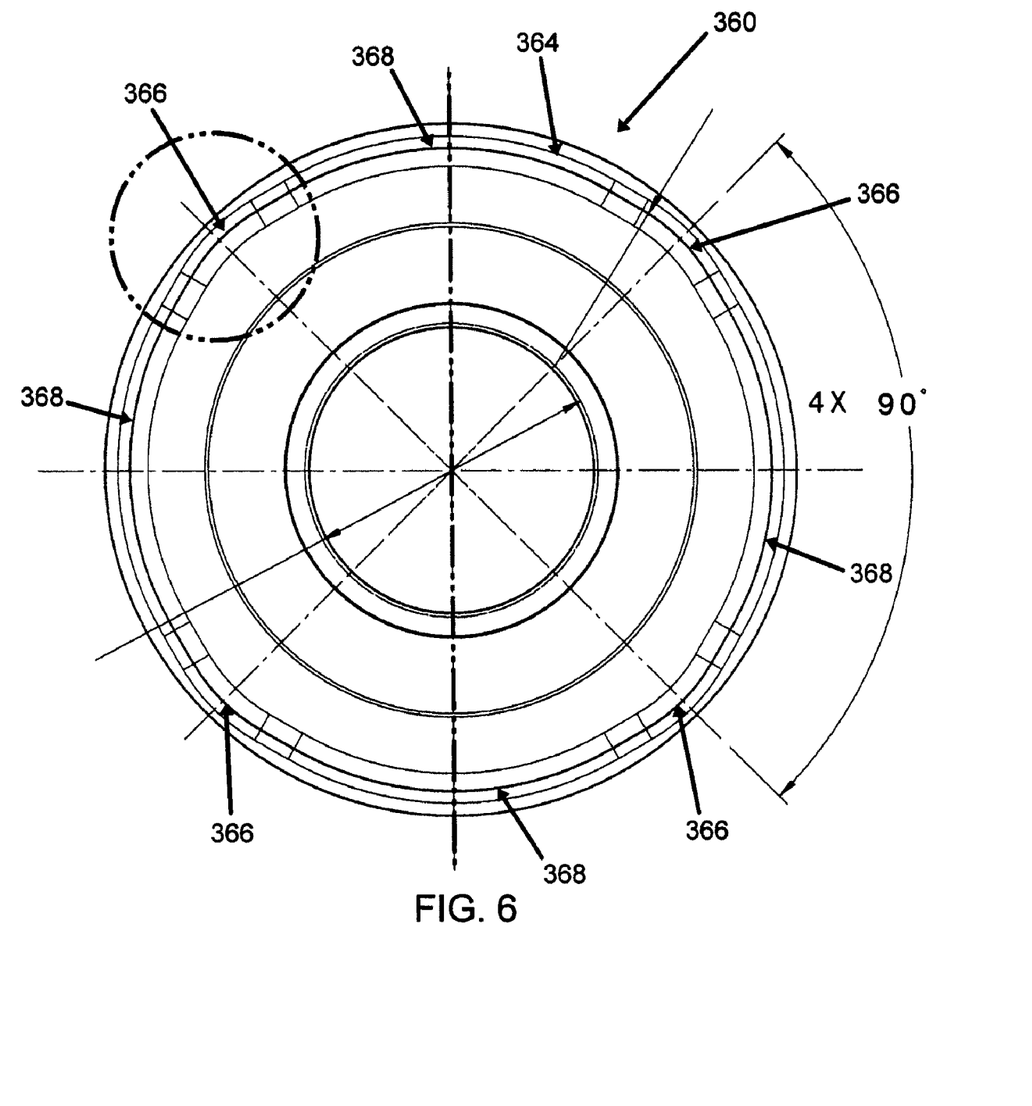
FIG. 6 is a plan view of the heat shield used in the assembly of FIG. 6.
Figure 7:
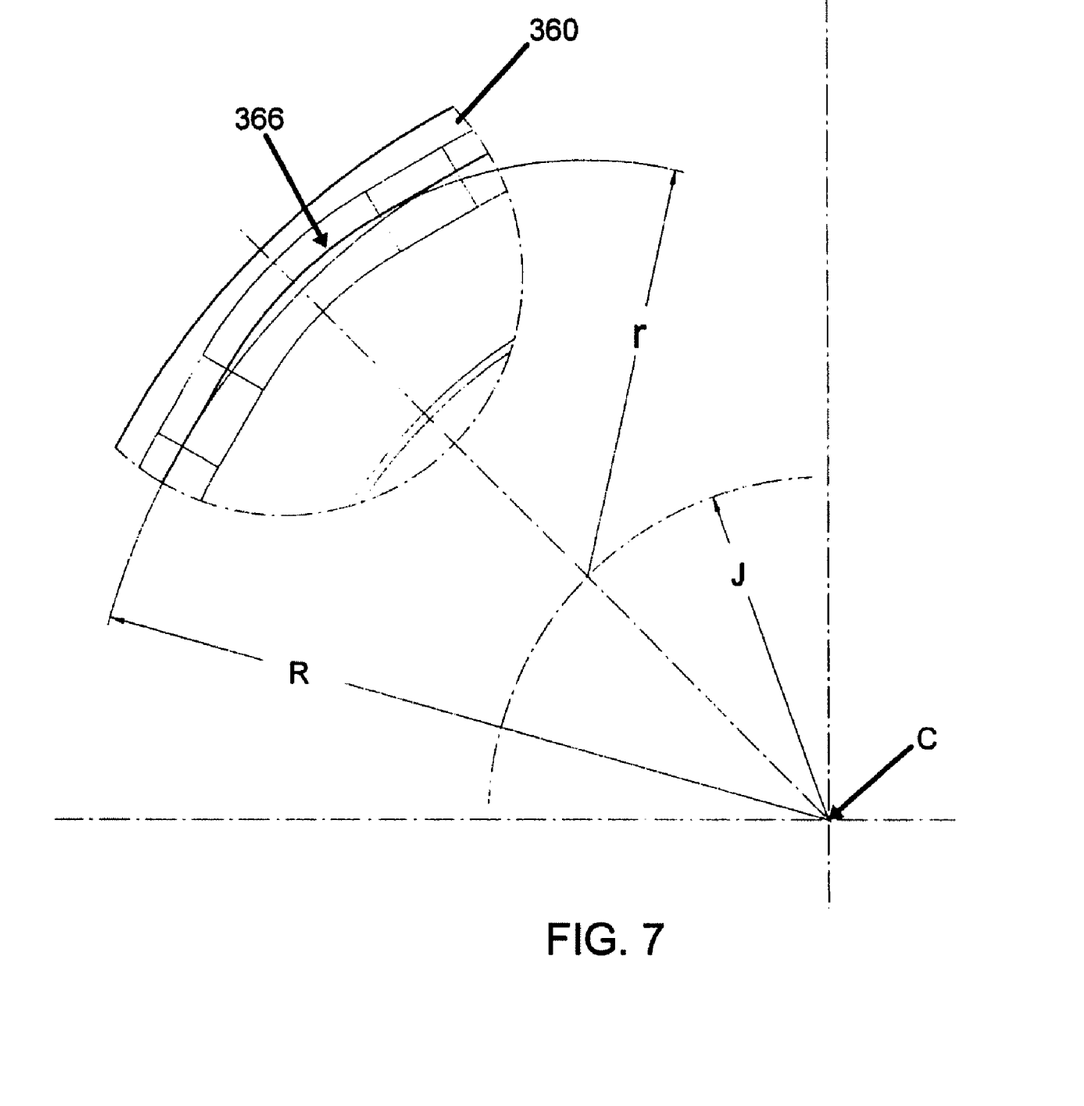
FIG. 7 shows a detail of the heat shield of FIG. 5.
Figure 8:
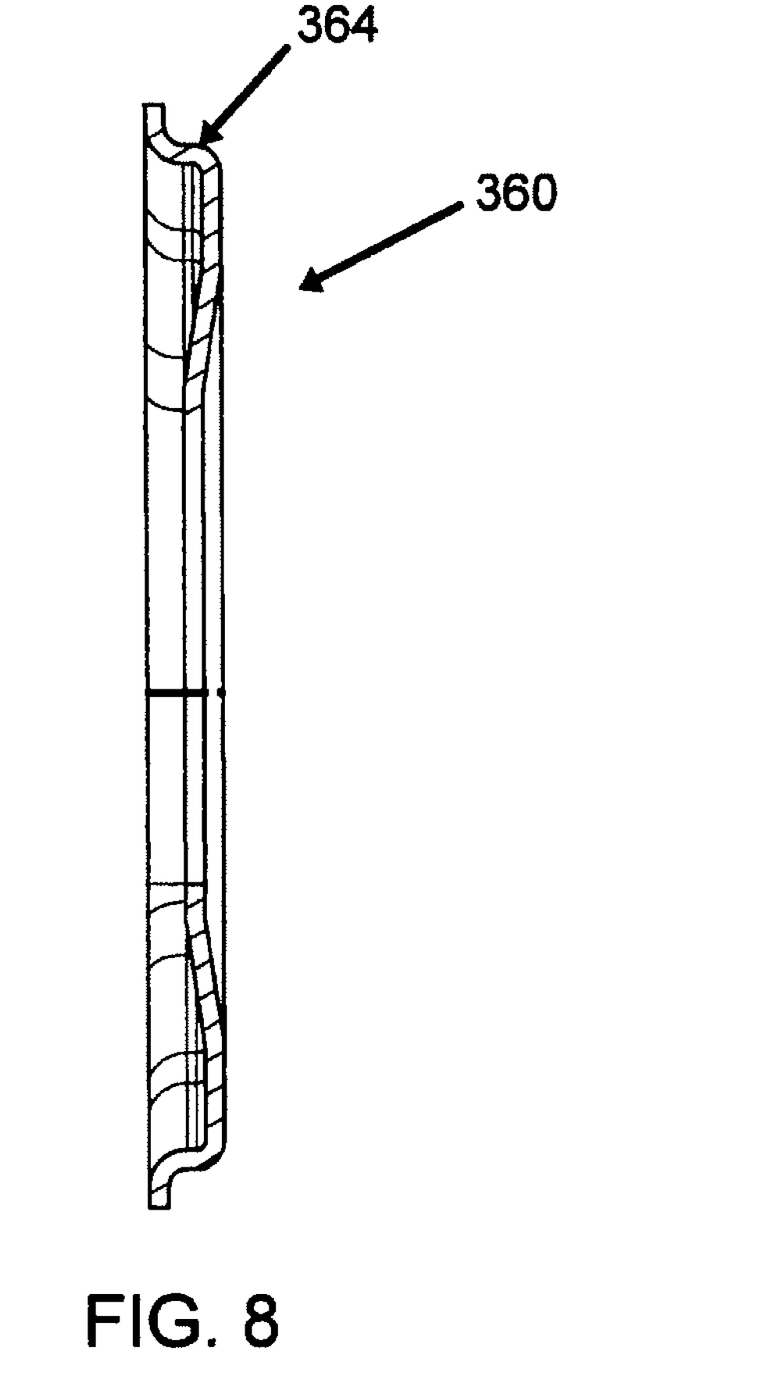
FIG. 8 is a cross-sectional view of the heat shield of FIG. 6.

The heat shield 360 includes an outer portion captured between the surfaces 345 and 115, and includes a centering portion 364 that engages a radially inwardly facing, substantially cylindrical surface 113 of the turbine housing in order to substantially center the heat shield relative to the turbine housing. In accordance with this embodiment, the centering portion 364 has a non-axisymmetric configuration as shown in FIG. 6. More particularly, the centering portion has four "lobes" 366 of relatively greater diameter from the center C of the heat shield. The lobes 366 are circumferentially spaced apart at approximately 90° intervals around the circumference of the heat shield. In between the lobes 366 the centering portion has relative smaller-radius portions 368 of a radius R. Each lobe 366 comprises a circular arc struck from a point that lies on a circle of radius J centered at the center C of the heat shield, the circular arc having a radius r. The sum of J and r is greater than R. Radial clearances exist between the smaller-radius portions 368 and the generally cylindrical surface 113 of the turbine housing, while the larger-radius portions or lobes 366 engage the surface 113 so as to locate the heat shield substantially coaxially with respect to a central longitudinal axis of the turbine housing.

This embodiment again allows the turbine housing to be machined or formed to have a generous radius 119 between the surfaces 117 and 115. A further advantage of the "lobed" heat shield 360 is that when the larger-radius portions or lobes 366 thermally expand against (and are constrained from expansion by) the turbine housing surface 113, the smaller-radius portions 368 are able to thermally expand to help relieve the thermally induced stresses.

The embodiments of the invention described above also have the advantage that some of the space between the center housing surface 245, 345 and the opposing turbine housing surface 115 (which is filled by the heat shield 160 in the FIG. 1 embodiment) is not occupied by the heat shield but rather is air space, which helps to reduce the heat transfer from the relatively hot turbine housing to the relatively cooler center housing.

Variations on the above-described embodiments are possible. For instance, the centering surface 248 of the center housing in FIG. 3 is shown as conical, but it can be only "generally conical" in the sense that it becomes smaller in diameter in the axial direction toward the turbine wheel, while not necessarily being linear in axial cross-section. Furthermore, the heat shield 360 is described as having four lobes 366, but it is possible for it to have a different number of lobes.

Thus, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An assembly for a turbocharger, comprising:

a turbine comprising a turbine housing and a turbine wheel mounted in the turbine housing and connected to a rotatable shaft for rotation therewith;

a center housing for containing a bearing for the shaft, the center housing having a nose portion adjacent the turbine wheel; and a heat shield disposed between the center housing and the turbine housing;

the nose portion defining a generally planar first surface facing generally axially toward and axially spaced from a generally planar opposing surface of the turbine housing, the first surface being spaced axially from the turbine wheel by a first axial distance, the nose portion further comprising a generally conical centering surface extending from the first surface and decreasing in diameter in an axial direction toward the turbine wheel, the centering surface being substantially coaxial with a central longitudinal axis of the center housing;

the heat shield having an outer portion captured between the first surface of the center housing and the opposing surface of the turbine housing, and a centering portion extending from the outer portion generally axially toward the turbine wheel, the centering surface of the center housing being positioned to engage the centering portion of the heat shield so as to locate the heat shield substantially coaxially with respect to the central longitudinal axis of the center housing;

wherein the center housing includes a generally cylindrical surface facing radially outwardly and located radially outwardly relative to the first surface and spaced axially from the turbine wheel by a distance greater than the first axial distance, the generally cylindrical surface of the center housing being substantially coaxial with the central longitudinal axis, and the turbine housing includes a generally cylindrical surface facing radially inwardly and engaged with the generally cylindrical surface of the center housing for coaxially locating the turbine housing relative to the center housing, and wherein a juncture extends between the generally cylindrical surface of the turbine housing and said opposing surface of the turbine housing, the juncture comprising a smoothly curved radius.

2. The assembly of claim 1, wherein the centering surface of the center housing joins with a generally planar second surface located radially inwardly relative to the centering surface and facing generally axially toward the turbine wheel and spaced axially from the turbine wheel by a second axial distance smaller than the first axial distance.

3. The assembly of claim 2, wherein the heat shield includes an inner portion joined with the centering portion and extending radially inwardly therefrom, and the inner portion is axially spaced from the second surface of the center housing.

4. The assembly of claim 1, wherein a radially outermost edge of the heat shield is spaced radially inward of the juncture.

* * * * *